United States Patent [19]
Folsberg

[11] Patent Number: 5,449,404
[45] Date of Patent: Sep. 12, 1995

[54] METHOD FOR MANUFACTURING CEMENT

[75] Inventor: Jan Folsberg, Valby, Denmark

[73] Assignee: F.L. Smidth & Co. A/S, Denmark

[21] Appl. No.: 245,351

[22] Filed: Apr. 26, 1994

[30] Foreign Application Priority Data

Nov. 27, 1991 [DK] Denmark .................. 1922/91

[51] Int. Cl.⁶ .................................... C04B 7/47
[52] U.S. Cl. ............................ 106/765; 106/748; 106/739
[58] Field of Search ................... 106/739, 748, 765

[56] References Cited

FOREIGN PATENT DOCUMENTS

| | | |
|---|---|---|
| 201137 | 7/1983 | German Dem. Rep. . |
| 3424170 | 2/1986 | Germany . |
| 3199144 | 8/1991 | Japan . |
| 1551269 | 8/1979 | United Kingdom . |
| 1313821 | 5/1987 | U.S.S.R. . |

*Primary Examiner*—Mark L. Bell
*Assistant Examiner*—Michael Marcheschi
*Attorney, Agent, or Firm*—Brumbaugh, Graves, Donohue & Raymond

[57] ABSTRACT

A method for manufacturing cement is described, by which gypsum is added to the clinker in the clinker cooler (3). Hereby it is obtained that the gypsum is dried in a safe, simple and inexpensive manner without substantial additional costs for establishment and operation.

6 Claims, 1 Drawing Sheet

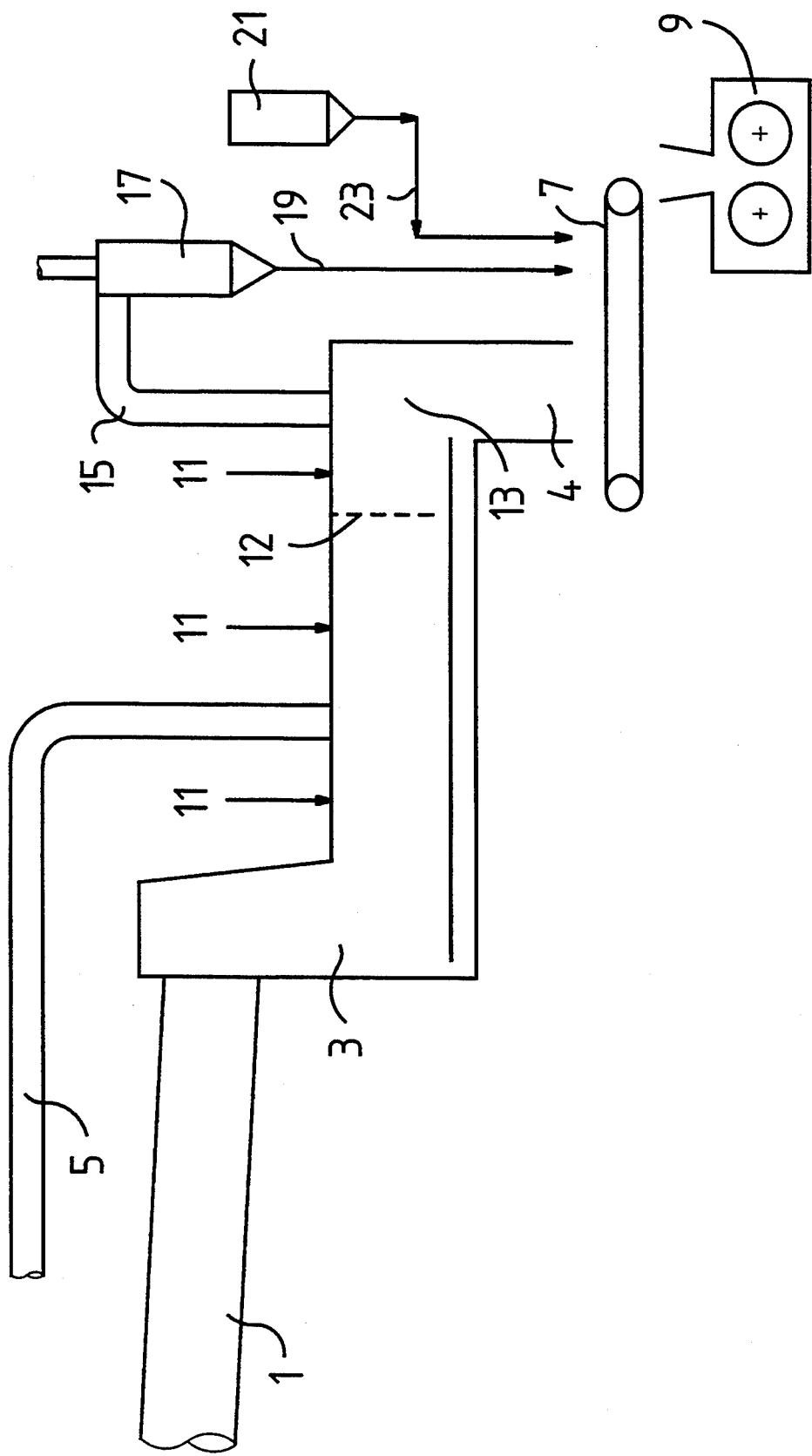

METHOD FOR MANUFACTURING CEMENT

BACKGROUND OF THE INVENTION

This is a continuation-in-part application of International Application PCT/DK92/00310 with an international filing date of Oct. 26, 1992, said International Application being based upon Danish Application 1922/91.

The present invention relates to a method for manufacturing cement.

Hitherto, in manufacturing cement it has been common practice that the finish-burnt and cooled clinker material is mixed with gypsum and possibly other additives and subsequently finish-ground in a grinding plant.

The added gypsum usually contains water which is required to be removed to avoid setting of the cement, and in grinding plants comprising a tube mill, the dehydration and drying of the gypsum often take place in the mill, in which the temperature is relatively high.

Tube mills are, however, relatively inefficient in that they are energy-demanding, and in fact the tendency today is that roller mills are used instead for finish-grinding of cement due to their higher efficiency.

However, the temperature in roller mills is rarely so high that a sufficient drying of the added gypsum is obtained, which has an adverse influence on the cement properties.

This problem has been dealt with in the past by adding gypsum which, before the addition, is dehydrated and dried in a separate drying installation, but this increases the preliminary expenses as well as the operating costs.

Another proposed solution to the problem consists of heating the material during the grinding by means of gas from a heat generator or by means of excess air from a clinker cooler, but as the retention time in, e.g., a roller mill is very short, the possibilities of obtaining a sufficient drying of the gypsum are very small.

From e.g. DD-201137, SU-1313821 and GB-1551269 it is known to introduce material components containing gypsum or the like into the zone between the kiln and the clinker cooler or into the first part of the clinker cooler, where the temperature typically is in the range from 800° to 1400° C.

The disadvantage of introducing the gypsum into or before the first and thereby the hottest part of the clinker cooler is that the gypsum is converted into insoluble anhydride which, when the finish-ground cement is used for making cement paste, mortar or concrete, has lost its desired effect which is to delay the setting of the cement.

SUMMARY OF THE INVENTION

The object of the invention is therefore to provide for a method for manufacturing cement, by which method the above-mentioned disadvantages by the known methods are avoided.

According to the invention, this object is obtained by a method of the kind mentioned in the introduction, and which is characterized in that at least a part of the gypsum required for the cement manufacturing is added to the clinker in the last section of the clinker cooler, which is the coolest section of the cooler.

Hereby the gypsum can be dehydrated and dried in a simple manner by means of the heated air resulting from the cooling of the clinker, and which usually is directed into the atmosphere via a filter. By being able to vary the charging point for the gypsum into the cooler, the retention time of the gypsum in the cooler may furthermore be adapted to fine as well as coarse types of gypsum so that these can be dried and dehydrated without previous grinding.

As compared to the methods using dehydration and drying in the actual grinding installation or in a separate drying installation, according to the invention the gypsum is dried in a safe, simple and inexpensive manner without substantial additional costs for installation and operation, and without any risk for the gypsum to be converted into insoluble anhydride.

The mixture of clinker and gypsum is transported from the clinker cooler onto a grinding plant where the finish grinding into cement takes place. To be able to manufacture different cement types containing different amounts of gypsum, it is preferred that the amount of gypsum charged into the cooler is smaller than or equal to the smallest amount of gypsum required in the finished cement. Subsequently, any fine adjustment of the gypsum percentage may be performed in the usual manner by adding gypsum during the finish grinding.

Dependent on the required dehydration degree of the gypsum, the temperature of the gypsum and its retention time in the clinker cooler may be regulated to the required dehydration degree by charging the gypsum into the clinker cooler at one or several different positions along the longitudinal direction of the cooler.

BRIEF DESCRIPTION OF THE DRAWING

The invention will now be described in further detail, with reference to the drawing, being diagrammatical and showing a part of a cement manufacturing plant, where the method according to the invention can be practiced.

DESCRIPTION OF THE PREFERRED EMBODIMENT

The plant comprises a rotary kiln 1, a clinker cooler 3 with an outlet 4, and an air duct 5 for supply of hot air from the clinker cooler 3 to a preheater not shown. Clinker material leaving the clinker cooler 3 via the outlet drops onto a feed conveyor 7 conveying the material to a roller press 9.

In the plant shown, gypsum may be charged into the clinker cooler 3 at charging points, for example 11a, 11b and 11c, distributed along the longitudinal direction of the clinker cooler.

The temperature in clinker cooler varies along its length, being hottest in the inlet end portion 12 closest to the kiln, where the temperature typically is from 800° to 1400° C., and becoming progressively cooler toward the outlet end portion 13, where the temperature is from about 200° C., or even less, to about 600° C. For present purposes, the outlet end portion of the clinker cooler is defined as that portion of the cooler comprising approximately one-third and no more than half of the cooler length measuring from the cooler outlet toward the kiln.

According to the invention, it is preferred that at least a portion of the total gypsum added to the cooler be added to the outlet end portion, and/or to a portion where the temperature is no higher than about 600° C., and is preferably less than about 200° C. It is further preferred that at least 50%, and preferably 75% or even 100% of the total gypsum that is added to the clinker cooler be added to the outlet end portion and/or to a portion where the temperature is less than about 600° C., and preferably less than about 200° C. The remaining gypsum, if any, can then be added at other points, e.g., 11a or 11b, along the cooler length, depending upon the required degree of dehydration. Thus the temperature and retention time in the clinker cooler may be regulated by charging a varying portion of gypsum at one or more points along the clinker cooler length other than the outlet end portion. It is also possible to provide multiple charging points 11c in the outlet end portion so as to permit charging into portions where the temperature may vary from less than 200° C. to less than 600° C.

The clinker cooler 3 may include a screen 14 which reduces the air flow from the outlet end portion 13 of the clinker cooler in the direction towards the kiln 1. The air from the outlet end portion of the clinker cooler can, therefore, with its content of gypsum dust, be passed via a separate duct 15 to a separator 17, which, e.g., may be a separation cyclone, a bag filter or an electrostatic precipitator, from which the separated dust is returned via a line 19 to the clinker/gypsum mixture, e.g., on the feeding belt conveyor 7.

When charging the gypsum into the clinker cooler 3 as proposed according to the invention, the gypsum is dehydrated and dried during its transport together with the hot clinker material through the cooler, and any additional gypsum to be added for adjustment of the gypsum percentage may, e.g., be added from a gypsum container 21 via a line 23.

I claim:

1. Method for manufacturing cement in a plant comprising a clinker cooler, said clinker cooler having a longitudinal direction with an inlet end portion and an outlet end portion, and a coolest section at its outlet end portion, said method comprising the steps of passing burned clinker cement into said cooler at said inlet end portion, through said cooler, and out of said cooler at said outlet end portion, adding an amount of gypsum to said clinker sufficient for the manufacture of cement, at least a portion of said gypsum being added to the clinker in the outlet end portion.

2. Method according to claim 1, characterized in that the amount of gypsum charged into the clinker cooler is smaller than or equal to the smallest amount of gypsum required in the finished cement.

3. Method according to claims 1 or 2, characterized in that the gypsum is charged into the clinker cooler at more than one point along the longitudinal direction of the cooler.

4. Method according to claims 1 or 2, characterized in that at least a part of the gypsum is added to a portion of the clinker cooler where the temperature is less than about 600° C.

5. Method according to claims 1 or 2, characterized in that at least a part of the gypsum is added to a portion of the clinker cooler where the temperature is less than about 200° C.

6. Method according to claims 1 or 2, characterized in that at least 50% of the gypsum added to the clinker cooler is added at the outlet end portion.

* * * * *